(No Model.)

J. W. FISHER & W. A. KINNEY.
SHAFT HANGER.

No. 433,779. Patented Aug. 5, 1890.

WITNESSES:
Fred G. Dieterich
Jos. A. Ryan

INVENTORS
John W. Fisher
Watson A. Kinney
BY Munn & Co.
ATTORNEYS

THE NORRIS PETERS CO., PHOTO-LITHO., WASHINGTON, D. C.

UNITED STATES PATENT OFFICE.

JOHN W. FISHER AND WATSON A. KINNEY, OF BRIDGETOWN, NOVA SCOTIA, CANADA.

SHAFT-HANGER.

SPECIFICATION forming part of Letters Patent No. 433,779, dated August 5, 1890.

Application filed December 4, 1889. Serial No. 332,530. (No model.)

*To all whom it may concern:*

Be it known that we, JOHN W. FISHER and WATSON A. KINNEY, residing at Bridgetown, Nova Scotia, Canada, have made certain new and useful Improvements in Shaft-Hangers, of which the following is a specification.

Our invention relates to a combined shaft-hanger and an idler or dead pulley support; and it has for its object to provide a hanger of this character which will equalize the lateral strain of the shaft and the weight of the pulley and provide an essentially universally-balanced bearing for said shaft.

It has also for its object to construct the bearing-boxes in said hanger so that the same may be employed either as a ceiling or floor shaft support.

To this end our invention consists in certain novel combinations and peculiar constructions of parts, all of which will hereinafter be fully described in the annexed specification, and particularly pointed out in the claims, reference being had to the accompanying drawings, in which—

Figure 1:
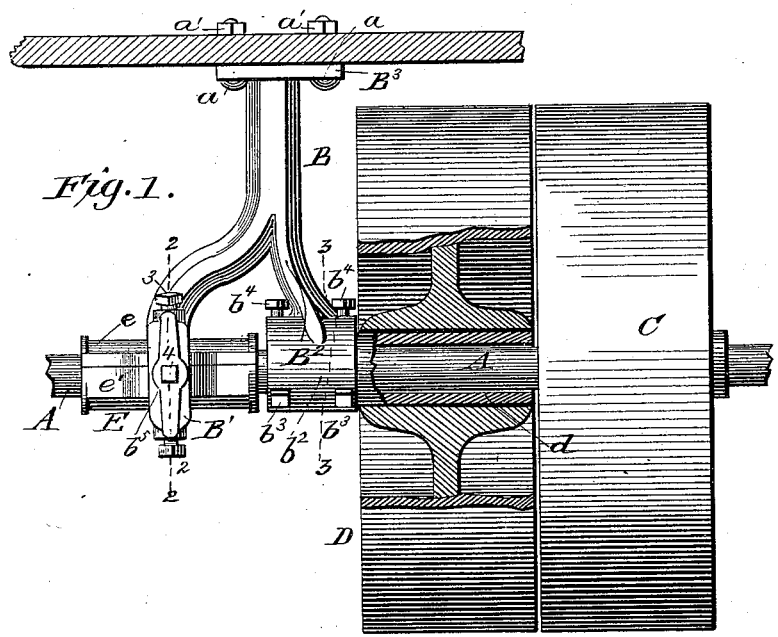
Figure 2:
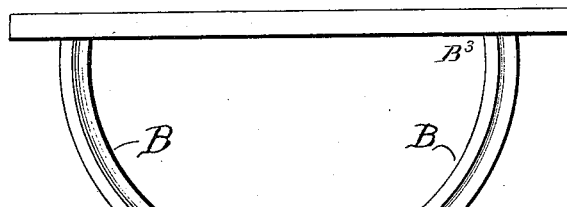
Figures 3, 4:
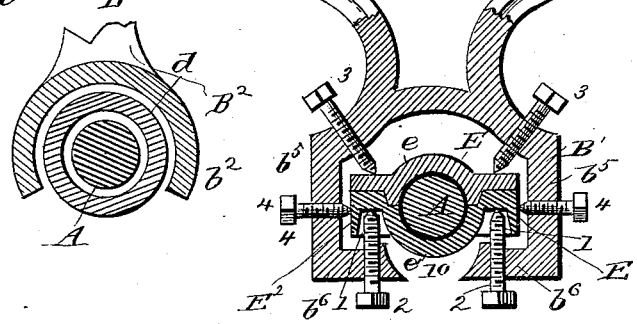

Figure 1 is a side view, partly in section, of our improved hanger. Fig. 2 is a cross-section of the same on the line 2 2, Fig. 1. Fig. 3 is a cross-section on the line 3 3, Fig. 1; and Fig. 4 is a detail view hereinafter referred to.

In the accompanying drawings, A denotes the drive-shaft, which is supported in arm B' of the bracket or hanger B, upon which is keyed the drive-pulley C.

D indicates the loose or idler pulley, journaled upon a sleeve $d$, which encircles the shaft A, and which is adjustably supported in the arm $B^2$ of the bracket in a manner most clearly shown in Fig. 3 of the drawings. By reference to said figure it will be seen that we form the lower face of the bearing-box $b^2$ on the arm $B^2$ with a longitudinal opening of sufficient width to permit the shaft being inserted through the same. The sleeve $d$ is adjustably held in said box $b^2$ by means of the adjusting-screws $b^3 b^3 b^4 b^4$, arranged as shown, which hold the said sleeve in a true position about the shaft A. The hanger B is provided with a foot portion $B^3$, which is secured by means of bolts $a$ $a$ and nuts $a'$ $a'$ to the ceiling, the lower portions of said arm being bifurcated and formed into lateral arms B' $B^2$, as shown. The arm B' extends somewhat lower than the arm $B^2$, and is formed with a slot 10 in the bottom to admit of the passage of the shaft when the hanger is put in position.

E denotes a long bearing-box formed of two sections $e$ $e'$, which embrace the shaft A and support it. By reference to the drawings it will be observed that the lower section $e'$ is cast with a recess 1 in the bottom at right angles with the shaft, in which extend the upper ends of the lower balance-screws 2 2, which pass up through the horizontal members $b^6$ of the hanger B'.

It will be observed that the bearing-box E is disposed centrally between the hanger-arms $b^5$ of the hanger, and the screws 2 2 and 3 3 being arranged in said arms $b^5$, as shown, that the said box has a central horizontal pivot-bearing.

4 4 denote horizontal adjusting-screws, which serve to give the bearing-box the proper lateral adjustment, such adjustment being permitted after the screws 2 2 and 3 3 have been adjusted, owing to the screws 2 2 operating in the recess 1 before referred to. The sides of the box are curved, as at E, (see Fig. 4,) so as to prevent the box or shaft binding against the adjusting-screws 4 4 in case of movement of said shaft or box. The two screws 3 3, which pass through the top, also serve to support the box when the hanger is reversed and used as a floor-shaft support.

The side wings $E^2$ of the box E are extended over the slot 10 in the hanger, so that in case the screws 2 2 become loosened and drop out the box will be caught on the horizontal arms $b^6$ $b^6$ of the hanger, thus making the same a safety-hanger.

To take down the shaft, all that would be necessary is to slacken the adjusting-screws and slip the box endwise, and the two parts thereof can be readily removed from the shaft. When our hanger is used as a floor-support, all that would be necessary is to turn the same upside down and fasten the foot portion $B^3$ down to the floor. It will also be understood that the sleeve $d$ and the loose pulley D may be made, if desired, in two parts, to permit the same being adjusted upon a shaft already in position.

From the foregoing description, taken in connection with the drawings, the advantages of our improvement will readily appear. It will be seen that by forming the bracket with lateral arms B' B², the arm B² having a bearing-box for the loose pulley and the hanger B having a bearing in its opposite arm for the shaft, that the strain of the shaft on the hanger at one arm is counterbalanced by the strain and weight of the loose pulley on the other arm of the hanger, and by arranging the bearing-box for the shaft in the manner described the shaft and the loose pulley may always be adjusted in true plane with each other.

Our invention is very simple in construction, and can readily be put in operative position.

Having thus described our invention, what we claim is—

1. A shaft-hanger comprising a bracket or hanger B, having bifurcated arms B' B², the arm B² provided with a bearing-box $b^2$, adapted to receive the loose pulley-supporting sleeve, the arm B', provided with a bearing-box adapted to receive the shaft, substantially as and for the purpose described.

2. The combination, with the hanger B, provided with bifurcated arms B' B², a sleeve $d$, journaled in the lower end of said arm B², adapted to support the idler or loose pulley D of the bearing-box E, formed of two parts $e$ $e'$, centrally adjustable in the lower ends of the arm B', substantially as and for the purpose described.

3. The combination, with the hanger-arm B', provided with side arms $b^5$ $b^5$, having horizontal members or extensions $b^6$, of a sleeve-like bearing-box E, formed of the upper and lower sections $e$ $e'$, the lower section provided with recesses 1, arranged at right angles to the shaft, screws 2 2, extended up through the horizontal extensions of the arms $b^5$ $b^5$, entering said recesses 1 and supporting the bearing-box, substantially as and for the purpose described.

4. The combination, with the arm B', provided with hanger-arms $b^5$ $b^5$ and horizontal members $b^6$ $b^6$, of the bearing-box E, centrally pivoted between said hanger-arms $b^5$ $b^5$, consisting of the two sections $e$ $e'$, formed with side wings or extensions E², lapping the members $b^6$ $b^6$, the lower section provided with recesses 1, arranged at right angles to the shaft, screws held in the members $b^6$ $b^6$, entering said recesses 1, screws 3, passed down through the arms $b^5$ and engaging the top of said box, said screws 2 3 horizontally adjusting said box, and screws 4 4, engaging said box at the sides and adjusting same laterally, substantially as and for the purpose described.

5. A hanger or shaft-support consisting of the bracket or hanger B, having lateral arms B' B², said arms formed with extensions or boxes adapted to receive and support the shaft-bearings and the loose pulley-sleeve, said extensions or boxes provided with longitudinal slots in their lower faces of slightly greater width than the shaft, substantially as and for the purpose described.

6. The combination, with the hanger having lateral arms B' B², a sleeve $d$, adjustably secured with the lower end of the arm B², a loose pulley D, mounted on said sleeve, of a shaft-bearing pivotally and adjustably supported in the lower end of the arm B', and means for adjusting said bearing, substantially as shown and described.

JOHN W. FISHER.
WATSON A. KINNEY.

Witnesses:
JOHN ERVIN,
ALBERT MORSE.